United States Patent [19]
Dahan

[11] Patent Number: 5,323,942
[45] Date of Patent: Jun. 28, 1994

[54] PHOTOGRAPHIC EQUIPMENT PACK

[76] Inventor: Elan Dahan, 5305 Empire Ave., Flagstaff, Ariz. 86004

[21] Appl. No.: 971,400

[22] Filed: Nov. 4, 1992

Related U.S. Application Data

[63] Continuation-in-part of Ser. No. 806,735, Dec. 10, 1991, abandoned, which is a continuation of Ser. No. 588,041, Sep. 24, 1991, abandoned.

[51] Int. Cl.$^5$ .............................................. A45F 3/04
[52] U.S. Cl. .................................... 224/215; 224/209; 224/907; 224/908
[58] Field of Search ............... 224/908, 909, 907, 259, 224/260, 262, 209, 215, 214, 216, 208, 211, 159, 160, 161, 210; 2/102

[56] References Cited

U.S. PATENT DOCUMENTS

| | | | |
|---|---|---|---|
| 2,586,954 | 2/1952 | Juliano | 224/908 |
| 3,507,424 | 4/1970 | Burkins | 224/908 |
| 3,661,308 | 5/1972 | Walters | 224/908 |
| 3,884,403 | 5/1975 | Brewer | 224/908 |
| 4,320,863 | 3/1982 | Lyer et al. | 224/908 |
| 4,416,405 | 11/1983 | Caillouet | 224/908 |
| 4,424,920 | 3/1984 | Moore | 224/215 |
| 4,461,411 | 7/1984 | Harrow | 224/908 |
| 4,561,576 | 12/1985 | Lowe et al. | 224/151 |
| 4,637,536 | 1/1987 | Wong | 224/909 |
| 4,923,060 | 5/1990 | Breslau | 224/908 |
| 5,016,797 | 5/1991 | Rowledge | 224/208 |
| 5,024,360 | 6/1991 | Rodriguez | 224/215 |

FOREIGN PATENT DOCUMENTS 2224635  5/1990  United Kingdom ............ 224/160

*Primary Examiner*—Linda J. Sholl
*Attorney, Agent, or Firm*—Gregory J. Nelson

[57] ABSTRACT

A carrying pack for photographic and similar equipment such as cameras and camcorders having a padded vest covering the chest of the photographer-user. The vest is secured to the user by detachable belt and straps extending to a lumbar member. The camera is secured to the shoulder area of the pack by floating adjustable straps. In the stored position, the camera assumes a position against the pad and is restrained by one or more adjustable retainer straps. In use, the camera may be quickly raised and the floating straps provide additional stability to steady the camera during use. An optional weather cover may be secured to the pad to cover the camera when not in use.

11 Claims, 4 Drawing Sheets

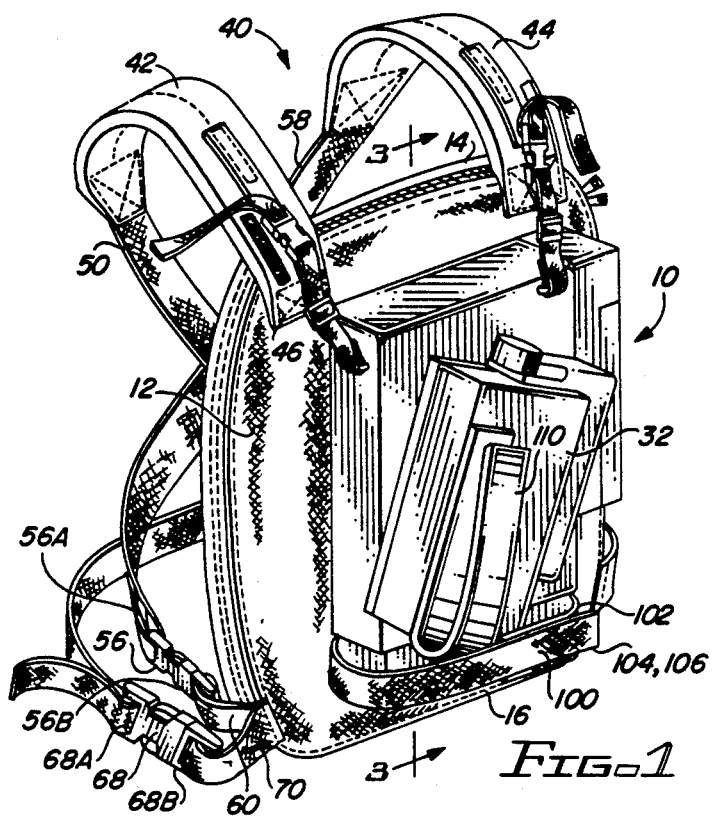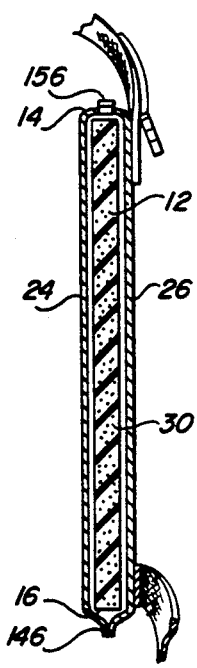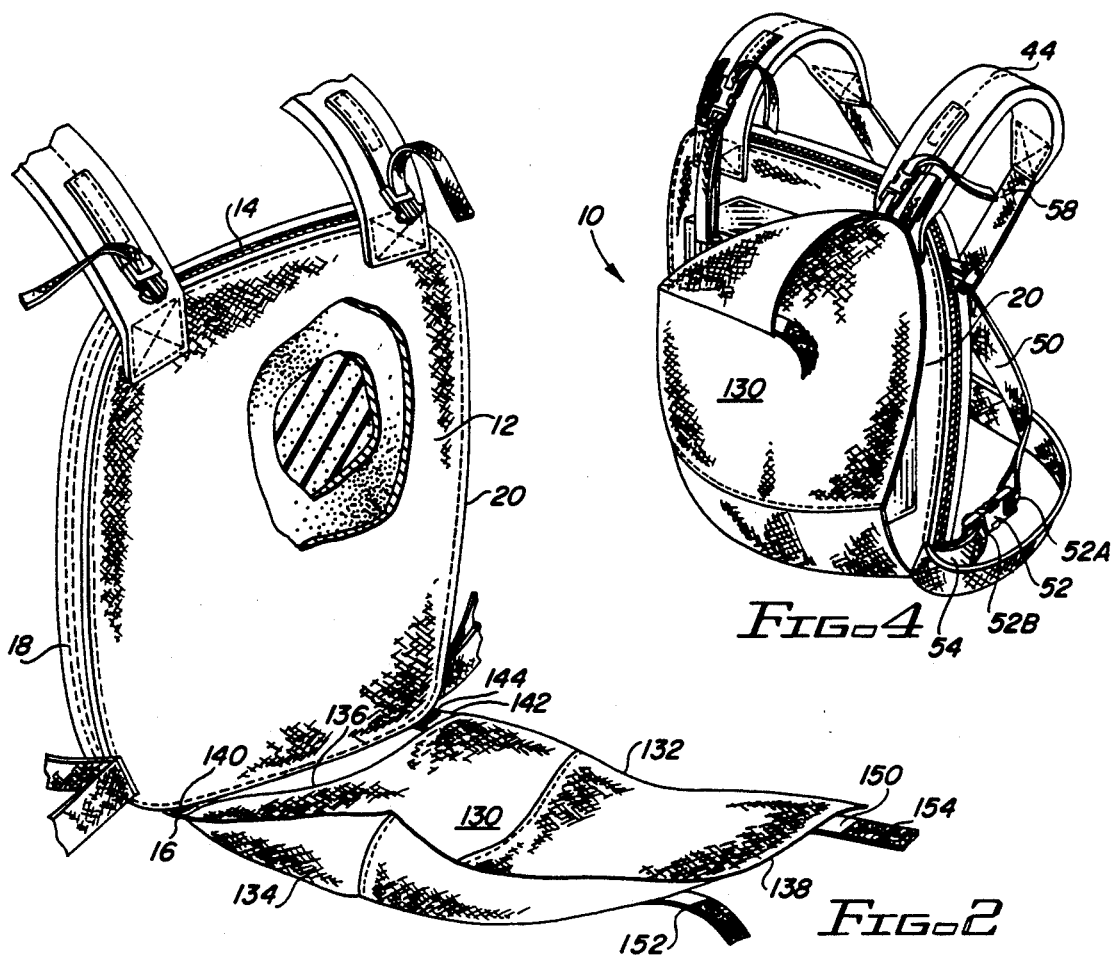

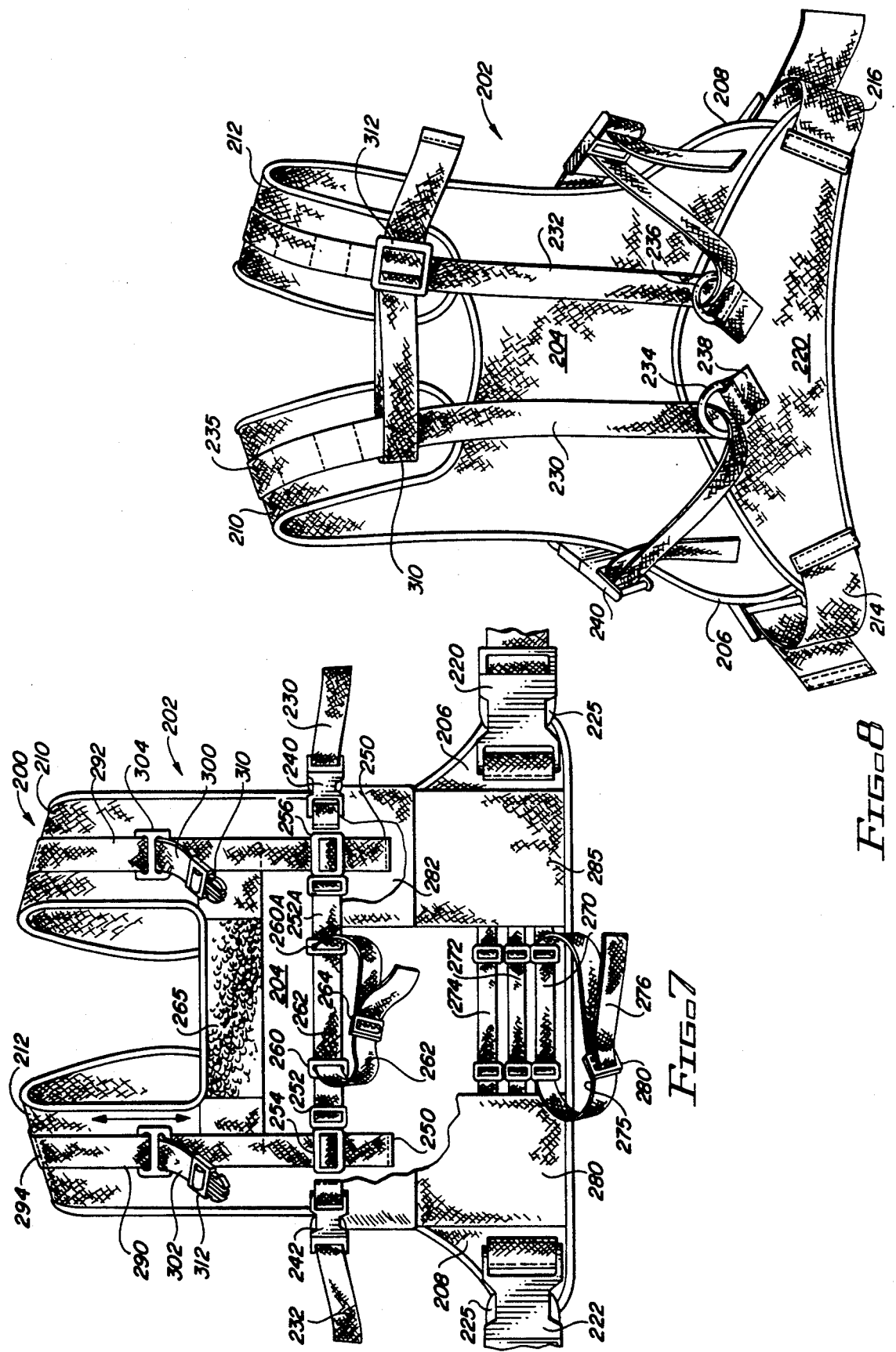

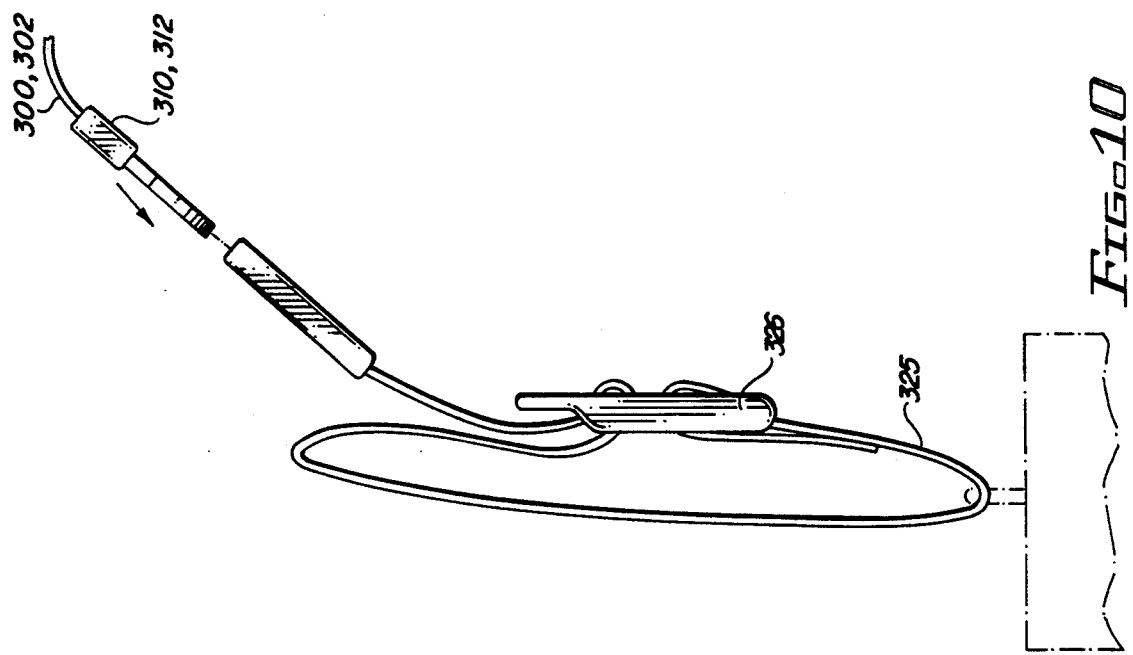
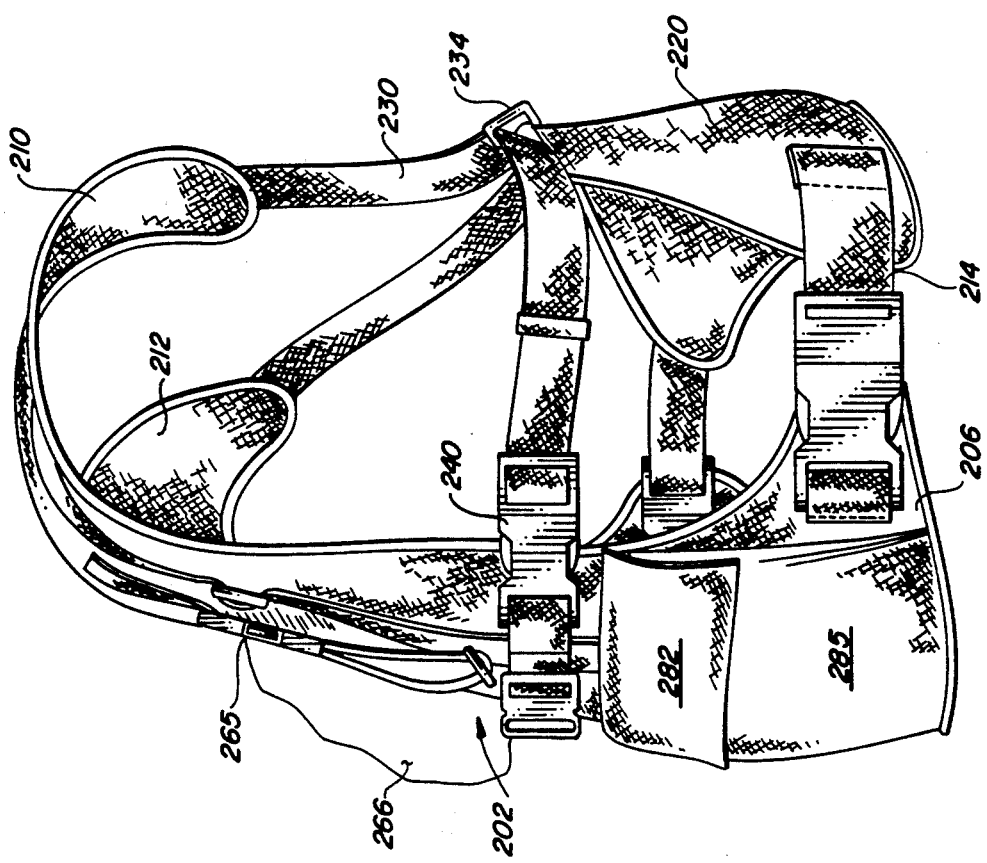

PHOTOGRAPHIC EQUIPMENT PACK

This application is a continuation-in-part of application Ser. No. 07/806,735, filed Dec. 10, 1991, now abandoned entitled "Photographic Equipment Pack" which is a continuation of Ser. No. 07/588,041, filed Sep. 24, 1991 having the same title now abandoned.

The present invention relates to a carrying apparatus and more particularly to a pack for the convenient storage of photographic equipment such as movie cameras, video recorders and the camcorders on the person.

Home movies have long been a popular way of recording events. The advent of the video recorder and the more recent introduction of the camcorder have greatly increased the popularity and expanded the use of portable photographic devices. The new video cameras are widely used for recording events such as family celebrations, children's activities and the like. In addition, these cameras being small, light and portable are convenient to record action-oriented activities such as skiing, hiking, mountain climbing and similar activities. Films of activities such as these not only provide entertainment when subsequently viewed but also provide instructional benefits as the participants can review form and technique to improve their skills in these activities.

Operating cameras of this type in active environments such as skiing can posse a problem for the photographer. Traditionally a camera must be carried by hand or in a protective case which is carried by the user. When the user wishes to film a subject, the camera must be removed from the case and placed in a position of use. Often this procedure is inconvenient and cumbersome and often the event which the photographer wishes to record will have elapsed by the time the camera is in a position of use.

Accordingly, there exists a need for an apparatus for the convenient storage and transportation of camera equipment such as movie cameras, video cameras and camcorders which will allow the user quick and easy access to the equipment.

Various film carriers can be found in the prior art. U.S. Pat. No. 4,714,184 shows an improved camera carrier for the convenient and secure belt-mounted carrying of a camera. The camera carrier includes a belt-mounted frame having a support plate receiving a supporting carrier plate which is attachable to the camera. A flexible tether line is connected between the carrier plate and a spring reel on the frame. The tether line accommodates camera movement between a stored position, resting on the support plate, and an easy carrying and operational position withdrawn from the support plate for normal photographic use.

U.S. Pat. No. 4,649,973 shows a camera case in which the case is suspended by a carrying strap in a position to provide access to the camera. The case is shaped to be universally adapted to receive cameras of different sizes. The carrying strap has its ends connected directly to the camera and has end portions loosely slidable in apertures provided in the cover of the case. Upon removal of the camera, the case is free to slide along the end portions of the strap until its cover engages shoulders provided on the straps to limit further movement. The end portions are adjustable in length.

U.S. Pat. No. 4,827,578 discloses a harness comprising a carrying strap and a gripper. The carrying strap is formed from a soft material. Another strap is formed from a stronger, less resilient fabric and is attached to the soft strap at uniformly spaced intervals in a way that the second strap forms loops at its points of attachment to the soft strap. The soft strap can only stretch until the loops become taut. Thereafter, the stronger second strap carries the load and this prevents the soft strap from tearing when heavy loads are carried. The gripper is formed from a resilient material and comprises a first plate and a second plate which are connected together by an arcuate web. One of the plates of the gripper has a flat body contacting surface and a loop is positioned in the arcuate web between the first and second plates for connection to a device to be carried. A plurality of pins are formed on at least one plate of the gripper. These pins penetrate the strap and attach the first and second plates of the gripper to the opposite surfaces of the end of the strap when the plates are squeezed together.

While the above devices are representative of various camera cases and carrying packs found in the prior art, certain deficiencies exist. Ideally a camera pack must be light weight and secure the camera in a position to provide convenient and easy access to the camera in the event the photographer observes a photographic subject and must take the photograph with minimum delay. If the camera is not easily and conveniently accessible, the photo opportunity may be lost. The pack should be comfortable and not unnecessarily interfere with the physical movements of the photographer and use of the equipment. The pack must also be configured to be universally adapted to receive cameras of various size, shapes and makes while providing adequate protection.

Briefly, in accordance with the present invention, a camera pack is provided having a chest-engaging pad member which is secured to the chest of the user by a harness having straps that extend from the pad member over the shoulder of the user and are detachable at the sides of the vest. A belt is also attached to the vest member and extends around the waist of the user and is adjustable. The camera is secured either to the shoulder harness or to the chest-engaging pad by adjustable floating straps which are engageable at attachment loops or apertures on the camera. In the normal stored position, the camera assumes a generally vertical position against the chest pad leaving the photographer's hands free. The camera is restrained against movement by a pair of transversely extending retainer straps which engage a portion of the camera and are closable at mating loop and hook fastener members. A weather protector panel is detachably securable to the vest and may be used to cover the camera when not in use. The camera is quickly accessible by removing the protector cover and removing the retainer straps from about the camera. The user may then grasp the camera and place in a position of use. The floating adjustment straps remain secured to the camera and provide additional stability for steadying the camera during photography.

As used herein, the word "camera" is used generally to denote any type of photographic device such as a home movie camera, video camera, camcorder or the like.

The above and other objects and advantages of the present invention will be more fully appreciated and understood from the following description, claims and drawings in which:

FIG. 1 is a front perspective view of the pack of the present invention showing a camera retained in place;

FIG. 2 is a front perspective view of the pack of the present invention with the camera removed and with the protective cover partially secured to the pack;

FIG. 3 is a sectional view taken along lines 3—3 of FIG. 1;

FIG. 4 is a front perspective view of the pack of the present invention with the camera in position and the protective cover secured in place over the camera;

FIGS. 7 to 10 illustrate an alternate embodiment of the pack of the present invention.

Figure 6:
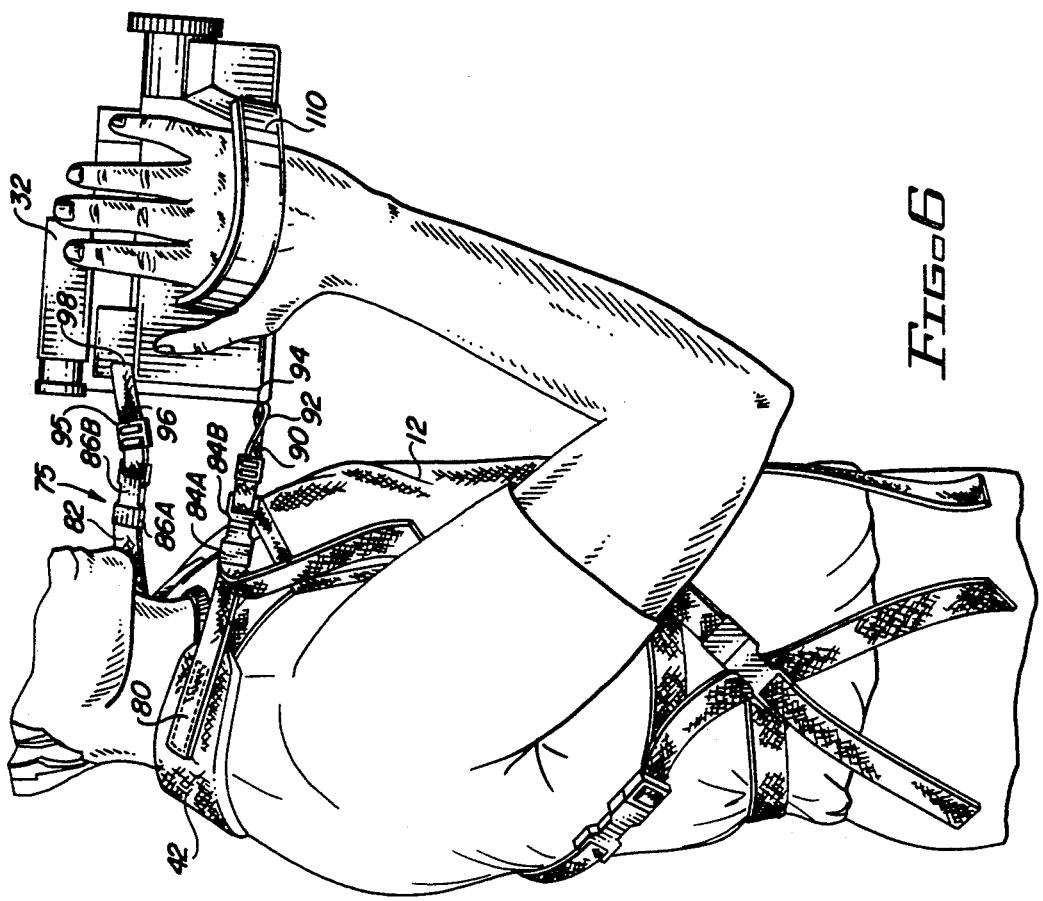
FIG. 6 is a side view of a portion of the torso of the user showing the camera pack in place and the camera held in a position of use.

Turning now to the drawings, the camera pack of the present invention is generally designated by the numeral 10 and includes a chest pad 12 which is shown as being generally rectangular having a top edge 14, bottom edge 16 and opposite side edges 18 and 20. The chest pad is of sewn construction having a covering of durable, flexible weather-resistant material such as nylon, corduroy or polyester duck. The chest pad has an inner surface 24 which in the position of use is positioned against the chest of the wearer. The outer surface 26 engages the camera 32 in a stored position. The chest pad is in the form of an envelope having an internal layer of resilient padding 30 which may be expanded foam or the like. The purpose of the padding is to provide comfort to the user and protection for the camera 32. The pad may be of various dimensions but typically would measure approximately 8½" in width, 10" in height and have an overall thickness of approximately ¾". Several sizes of the pack of the present invention may be provided consumers.

The pad is held in place by a harness 40 which includes shoulder straps 42 and 44 which are horizontally spaced apart. Each of the shoulder straps are essentially identical and each are shown as being of stitched construction and is of resilient material for the comfort of the user. Each strap has an anterior end 46 which is sewn or otherwise secured adjacent the upper edge 14 of the protector pad. The posterior end of the shoulder straps terminate in an area generally corresponding to the shoulder blade of the user. The end of shoulder strap 42 is secured to a back strap 50 which extends across the back of the user and terminates at a fastener 52 (FIG. 4). Fastener 52 is shown as a bayonet-type side release buckle having separable portions 52A and 52B. Fastener portion 52B is secured to a short side strap 54 secured at the lower portion of side 20 of the pad. The lower end of strap 50 extends through a loop 55 formed in fastener portion 52A which allows the effective length of strap 50 to be adjusted. Various buckles of this general type can be found in the prior art and one such buckle fastener arrangement is sold under the trademark "FASTEX" as more fully described in U.S. Pat. Nos. 4,150,464 and 4,171,555.

The opposite shoulder pad 44 is connected to back strap 58 which in the use position extends across the back of the user terminating at fastener member 56. The fastener 56 is similar to fastener member 52 having interlocking components 56A and 56B. Fastener member 56B is secured to the lower portion of side 18 of pad 12 at strap 60. The effective length of strap 52 is adjustable at fastener 56A.

Figure 5:
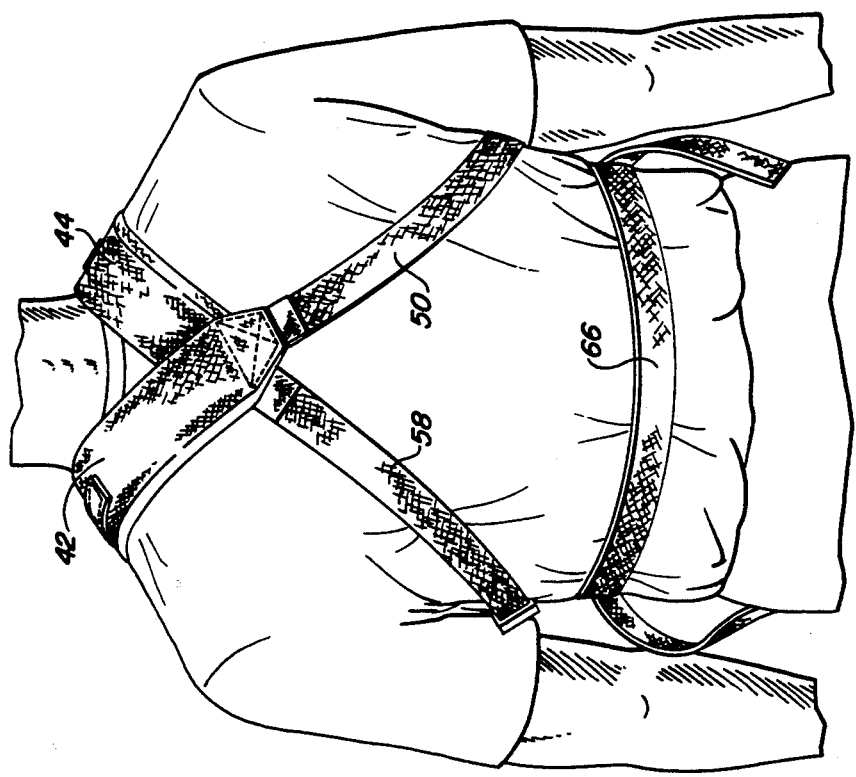
FIG. 5 is a rear view of a portion of a torso of the user with the camera pack secured in place.

As best illustrated in FIG. 5, with the camera pack in a position of use, the padded straps 42 and 44 extend over the shoulder area of the user. The attached back straps 50 and 58 criss-cross extending across the back and around the sides of the user being detachably securable to the pad at fastener assemblies 52 and 56. In addition, a belt 66 extends around the waist of the user having one end secured at the lower portion of edge 20 at the pad by stitching or the like. The opposite end of the belt 66 is adjustably secured to fastener 68 having fastener member 68A detachably receivable in member 68B. Member 68B is secured by a short strap 70 to the lower edge of pad side 18. The effective length of the belt 66 is adjustable by the user by adjusting straps 66 relative to fastener section 68A.

The camera 32 is secured to the pack by a pair of adjustable stabilizer assemblies 75 as best seen in FIG. 6. The adjustable assemblies attach to the pack at shoulder straps 42 and 44. The assemblies may also be attached to the upper portion of the pad 12. It is preferred for stability that the adjustable assemblies attach so as to generally align with the shoulder straps so tension applied to the adjustable assemblies will be transmitted to the shoulder straps.

A flexible strap 80 has its one end fixedly secured to shoulder strap 42 by sewing. The opposite end of strap 80 is secured to fastener member 84A at an adjustable loop. Fastener 84A is a fastener of the side-release, bayonet type as has been described above which cooperate with mating fastener member 84B. Detachable female fastener members 84A and 84B are attached to a strap 90 which forms a loop 92 at its distal end which is securable in an aperture or loop 94 on the camera. Similarly, shoulder pad 44 is secured to a flexible strap 82 which terminates at the female portion 86A of a detachable fastener. The male portion 86B of the fastener is secured to a strap 96 which also forms a loop at its distal end securable to the point of attachment 98 on the camera. The length of the adjustable assemblies are adjustable at buckles 95 interposed at an intermediate location along the straps 90 and 96.

The effective length of straps 80 and 82 may be adjustable at their respective fastener components 84A and 86A to adjust the position of the camera so that in a normal position of repose the camera will assume a vertical position against the chest pad as seen in FIG. 1. To retain the camera in this stored position, retainer straps 100, 102 each have one end secured to the front 26 of the pad. The opposite or outer ends of straps 100 and 102 each carry a portion 104 and 106 of a closure member such as a loop and hook closure member of the type sold under the trademark "Velcro". The straps 100, 102 can be extended about a portion of the camera and secured in place at fastener members 104 and 106 to restrain the camera from undesirable movement in the stored position.

When use of the camera is desired, fastener members 104 and 106 are disengaged and the user may easily grasp the camera at grip 110 and elevate the camera to a position of use as shown in FIG. 6. Note in this position, straps 75 provide the user with adequate freedom to properly manipulate the camera and serve to assist in steadying the camera, particularly if the straps are pulled taut as shown in FIG. 6 with the user's forearm serving as a brace.

Thus, in the event a photographer desires to photograph an active photographic subject such as a snow skier and in which situation the photographer may also be moving, the camera is in a position for swift and easy access. The strap arrangement provides the photographer with freedom of movement to make camera shots in all directions. The arrangement provides stability for the camera with the tension imposed on the tether assemblies transferred to the harness and upper body of the user. In a position of non-use for storage, the camera assumes an out-of-the-way position at the chest of the user and is restrained by the straps 75 and the retainer strap 100, 102 against undesired movement. Both the photographer and the camera are further protected by the resilient material 30 within the protector pad.

As a further feature, the camera pack may also be provided with a weather protector or shield as shown in FIGS. 2 and 4. The weather shield is shown as a panel 130 of weather proof material such as material sold under the trademarks Gore Tex or Ultrex. The weather shield is shown as being generally rectangular having opposite sides 132, 134, lower edge 136 and upper edge 138. The overall dimensions of the protector panel generally correspond to the size of the protector pad worn by the photographer. A pair of tabs 140, 142 extend from the lower edge 136 of the protective cover. Each tab carries a portion 144 of a mating loop and hook fastener member which is detachably securable to a mating section 146 along the lower edge 16 of the protector pad. Similarly, detachable tabs 150 and 152 are provided along the upper edge 138 of the protective cover. Again, each of the tabs carries a fastener section 154 which is detachably securable to mating fastener members 156 extending along the upper edge 14 of the protector pad. With the camera in the position shown in FIG. 1, the protector pad can be easily secured at its top and bottom edges as shown in FIG. 4 to provide protection to the camera against dust, moisture and the like.

FIGS. 7-10 show an alternate embodiment of the present invention which is generally designated by the numeral 200. The embodiment 200 is functionally similar to that described in FIGS. 1-6 providing a carrying pack for photographic equipment particularly camcorders which pack provides comfort, ease of positioning and removal. The pack shown in FIGS. 7-9 is easily adjustable to the physical requirements of the wearer and adjustable to accommodate various items of photographic equipment such as various styles and models of camcorders.

As shown in these figures, the embodiment includes a vest 202 which is a soft item preferably fabricated from a material such as nylon, canvas or the like. The vest 202 is preferably composed of an outer and inner layer of pliable material with soft padding interposed between the plies. The vest 202 has an anterior body portion 204 which extends generally in the chest area of the user. Flaps 206 and 208 extend partially around the sides of the wearer from the opposite lower sides of the body 204. Shoulder flaps 210 and 212 extend upwardly from the body of the vest and are adapted to extend over the shoulder area and downwardly on the back of the wearer in the area of the scapula. A lumbar member 220 has a generally triangular configuration and is secured to the flaps 206 and 208 by oppositely extending belt members 214 and 216 which belts are adjustably secured to the flaps 206 and 208 by fasteners 220 and 222. The fasteners 220 and 222 may be conventional buckles having inter-engaging male and female members which may be disengaged by applying lateral pressure to the prongs 225 of the male portion of the fastener.

A pair of rear shoulder straps 230 and 232 depend from the shoulder flaps 210 and 212 and are stitched thereto at 235. The shoulder straps 230, 232 extend through D-rings 234 and 236, respectively, secured by stitched tabs 238 to the upper edge of the lumbar belt 220. Strap 230 is detachably secured to the front of the body portion of the vest at an elevation approximately corresponding to the rib area of the wearer. The end of strap 230 is provided with fastener member 240 having male and female portions. Strap 232 is similarly secured at the opposite side of the outer surface of the vest portion at fastener member 242. The straps 230 and 232 may be retained by transversely extending belt loop 310 secured at buckle 312.

Strap 210 extends forwardly over the shoulder area and depends downwardly along the vest terminating at end 250 in the abdominal region. Strap 212 is similarly secured extending forwardly over the opposite shoulder. Camera-retaining strap 252 extends from the strap 212 having a buckle 254 slidable on strap 212 which permits the vertical position of the horizontally extending strap 252 to be adjusted to accommodate various types of carried equipment. Strap 252A is similarly adjustably secured to strap 210 at buckle 256. Straps 252 and 252A are relatively short and each carry an adjustable buckle 260 and 260A, respectively. A retention strap 262 extends through the buckles 260, 260A and forms a loop in its closed position. An adjustable buckle 264 is provided so that the strap 262 may be tightened about a camera or other object secured at the front of the vest. The arrangement permits vertical adjustment of retention strap 260.

It will be appreciated instead of mechanical buckles at points of attachment such as buckle 264, fasteners such as loop and hook fasteners such as the type sold under the mark Velcro may be used. A loop and pile fastener section 265 is provided above strap 262 for securement of a fabric weather cover or pouch 266, FIG. 9.

A plurality of straps 270, 272 and 274 extend horizontally along the lower portion of the front or anterior body of the vest. The straps are stitched to the front of the vest at opposite ends and each carries a pair of spaced-apart loops 275. A retainer strap 276 may be selectively placed through loops 275 associated with any of the straps 270, 272, 274. Strap 276 carries a fastener 280 which may be a mechanical fastener or a loop and hook type fastener. Thus, strap 276 may be positioned at a vertical location as required by the physical shape and size of the article to be retained. In the camera-retained position, straps 264, 276 are tightened about the item at selected spaced-apart locations, securing the item in a stored position against the chest and abdomen of the user. The retaining straps 264 and 276 may be quickly released when it is desired to use the camera.

Pockets 280 and 285 may be provided at opposite edges of the front portion of the vest for containment of accessory items. The pockets have suitable closures 282.

Straps 290 and 292 are each stitched to the front of the vest on the flaps 210, 212, respectively, at spaced-apart locations 294 and 296. Floating straps 300 and 302 each have a buckle 304 which is slidable along the associated strap 290, 292 between the stitch points. Fasteners 310 and 312 are securable to an attachment loop on the camera.

FIG. 10 shows a camera attachment loop 325 having a ladder lock loop 326 which is securable to fastener 310 and 312 on the floating straps. Thus, when straps 300 and 302 are released, the item such as the camcorder will hand vertically from the strap assemblies consisting of straps 290 and 302 on one side and straps 292 and 300 on the other side. The camera is in a ready position for use and may be swung to a horizontal position and steadied in a manner similar to the use position shown in FIG. 6. When not in use, the item may be returned to the stored position and secured by straps 264 and 276. The suspension system provides multiple point adjustment at straps 300, 302 and at camera attachment straps 325.

Thus, it will be seen that the pack as shown in FIGS. 7 to 10 is easy for the wearer to don, it is adjustable to the various physical size and requirements of the wearer and will accommodate a wide variety of carried items such as cameras and camcorders of various styles. In the stored position, the camcorder or stowed item is held snugly against the chest and abdomen of the user with the padded anterior portion of the vest protecting both the equipment and the user. Pockets are provided for various accessories. The position of the retention straps can be adjusted in accordance with the equipment carried. When released, the straps depending from the shoulder area suspend the item in a ready position for use and when the camcorder or other item is swung to a horizontal position, assists in standing the item in a position of use.

The carrying apparatus is light weight and has a fashionable appearance and may be worn as an outer garment and in colder temperatures may be easily worn beneath a jacket or coat.

From the foregoing, it will be seen that the present invention provides a highly effective light-weight and convenient camera pack which can be used with a wide variety of camera equipment. The device can be easily and inexpensively manufactured and can be quickly adjusted to the physical requirements of the user and to the particular camera to be used. In the stored position, the camera is out of the way leaving the photographer's hands free and unencumbered so that the photographer can, for example, ski along side another skier to be photographed. When the photographic opportunity occurs, the camera is readily accessible to simply detaching at least one side of the protective cover and loosening the retainer strap. The camera can then be elevated to a position of use and steadied by pulling the straps taut. In some situations, particularly good weather, the protective cover may be left off.

It will be obvious to those skilled in the art to make various changes, alterations and modifications to the photographic equipment pack of the present invention. To the extent such changes, alterations and modifications do not depart from the spirit and scope of the appended claims, they are intended to be encompassed therein.

I claim:

1. A pack for the retention and storage of a camera to be worn by a wearer comprising:
  (a) a soft, flexible pad having flaps extending over the wearer's shoulders and having bottom and opposite sides and front and rear surfaces adapted to be worn by the wearer with the rear surface adjacent the chest of the user, said pad including resilient padding;
  (b) a lumbar belt extending in the lumbar area of the wearer and extending between the opposite sides of said pad and having attachment means thereon being adjustably and detachably secured thereto;
  (c) a first strap which in the worn position extends from one shoulder flap over one shoulder of the wearer to the attachment means on the lumbar belt and being attached at one side of the pad;
  (d) a second strap which in the worn position extends from the other shoulder flap over the other shoulder of the wearer to the attachment means on the lumbar belt and being attached at the other side of the pad;
  (e) first and second adjustable stabilizing straps respectively extending from each of the flaps in the shoulder area attachable to a camera to suspend said camera in a position of non-use against said pad and allowing the wearer to manually support the camera in a position of use away from said pad with said first and second stabilizing straps taut to secure and stabilize said camera when held in a position of use, said stabilizing straps being adjustable to support the said camera with the wearer's arm serving as a brace in a use position; and
  (f) retainer means attached to the front of the pad for selectively securing said camera in said position of non-use and releasable to permit said camera to be moved to a position of use.

2. The pack of claim 9 further including a protective cover detachably secured to said pad.

3. The pack of claim 1 wherein said stabilizer straps include releasable fasteners for detachably securing said camera to said pack.

4. The pack of claim 1 wherein said pad is of weather proof material.

5. The pack of claim 1 wherein said retainer means comprise straps including fasteners of the loop and hook pile type.

6. The pack of claim 1 wherein said pad has an outer cover of weather proof material and said resilient padding comprises expanded foam.

7. The pack of claim 1 further including at least one pocket secured to said pad for containment of accessories.

8. The pack of claim 1 wherein said retainer means are at spaced-apart locations which are relatively adjustable to accommodate various camera configurations.

9. A pack to be worn by a wearer for retaining and using a camera comprising:
  (a) a pad having means to attach the pad to the front of the torso of the body of a wearer;
  (b) at least one adjustable stabilizing strap extending from the pad adjacent one shoulder of the wearer and adapted to be attached at a pre-adjusted length thereof to said camera at the wearer's chest in a storage position;
  (c) means to anchor said stabilizing strap in a position adjacent said shoulder to maintain said predetermined length of the stabilizing strap such that when the camera is held by the wearer's arm and hand at eye level in a focusing position while maintaining said stabilizing strap taut and generally horizontal, a generally triangular braced support is provided for the camera formed by the wearer's arm, said taut stabilizing strap and the torso of the wearer to hold the camera horizontal; and
  (d) means to hold said camera against said pad in said storage position.

10. A pack as specified in claim 9 further including:
  (a) a second adjustable stabilizing strap extending from the pad adjacent the other shoulder of the wearer and adapted to be attached at a predetermined length thereof to the said camera in the storage position; and (b) means to anchor said second stabilizing strap in a position adjacent the other shoulder of the wearer to maintain said predetermined length of said stabilizing strap such that when the camera is held by the wearer's arm and hand at eye level in a focusing position while maintaining both stabilizing straps taut and generally horizontal in a double, generally triangular braced support is provided for the camera formed by the wearer's arm, said taut stabilizing straps and the torso of the wearer which resists turning the camera about a vertical axis.

11. The pack as specified in claim 9 wherein said adjustable stabilizing strap allows slidable movement at said anchor means with a limit of upward movement at said position adjacent said shoulders.

* * * * *